Patented Nov. 18, 1924.

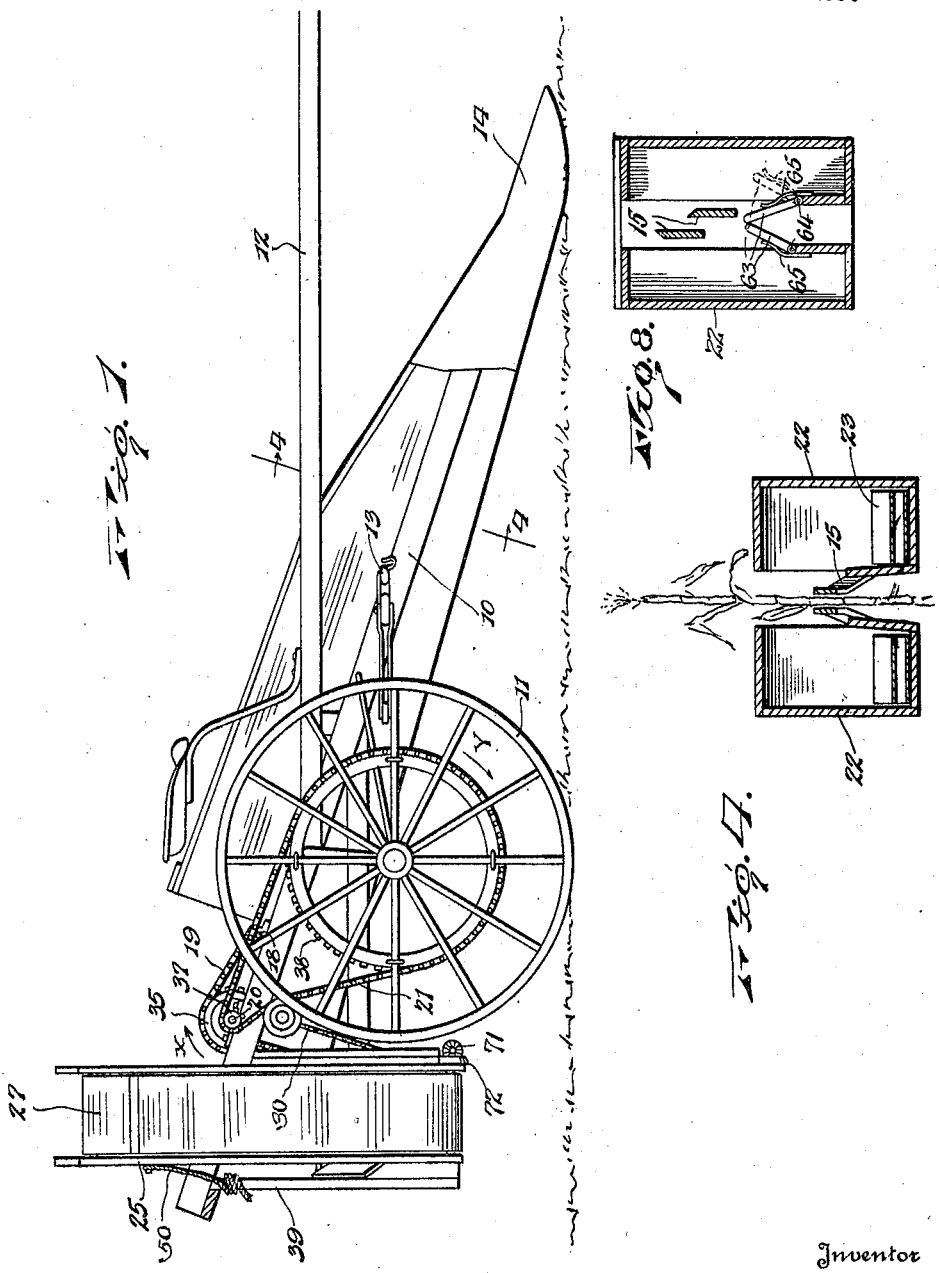

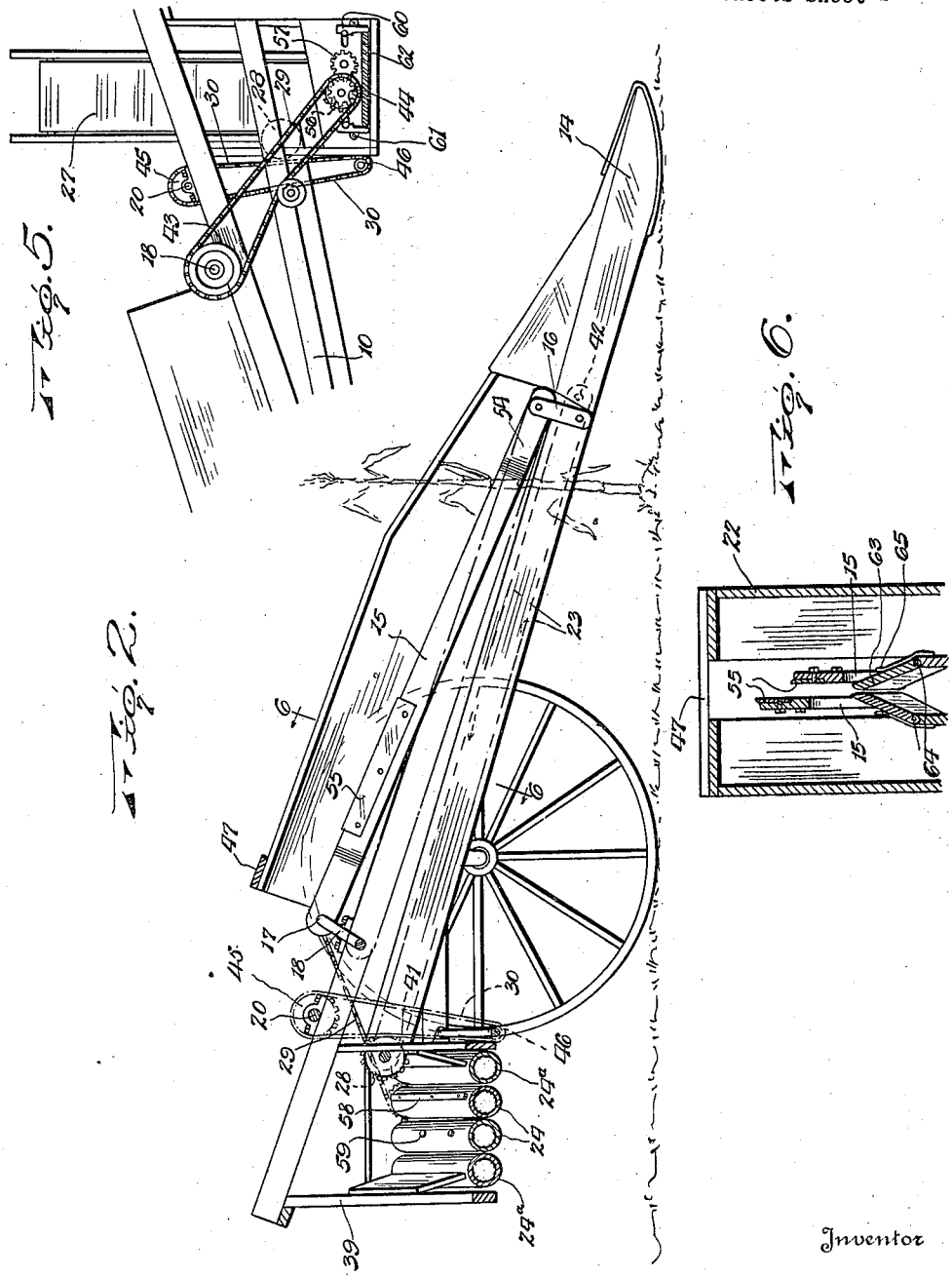

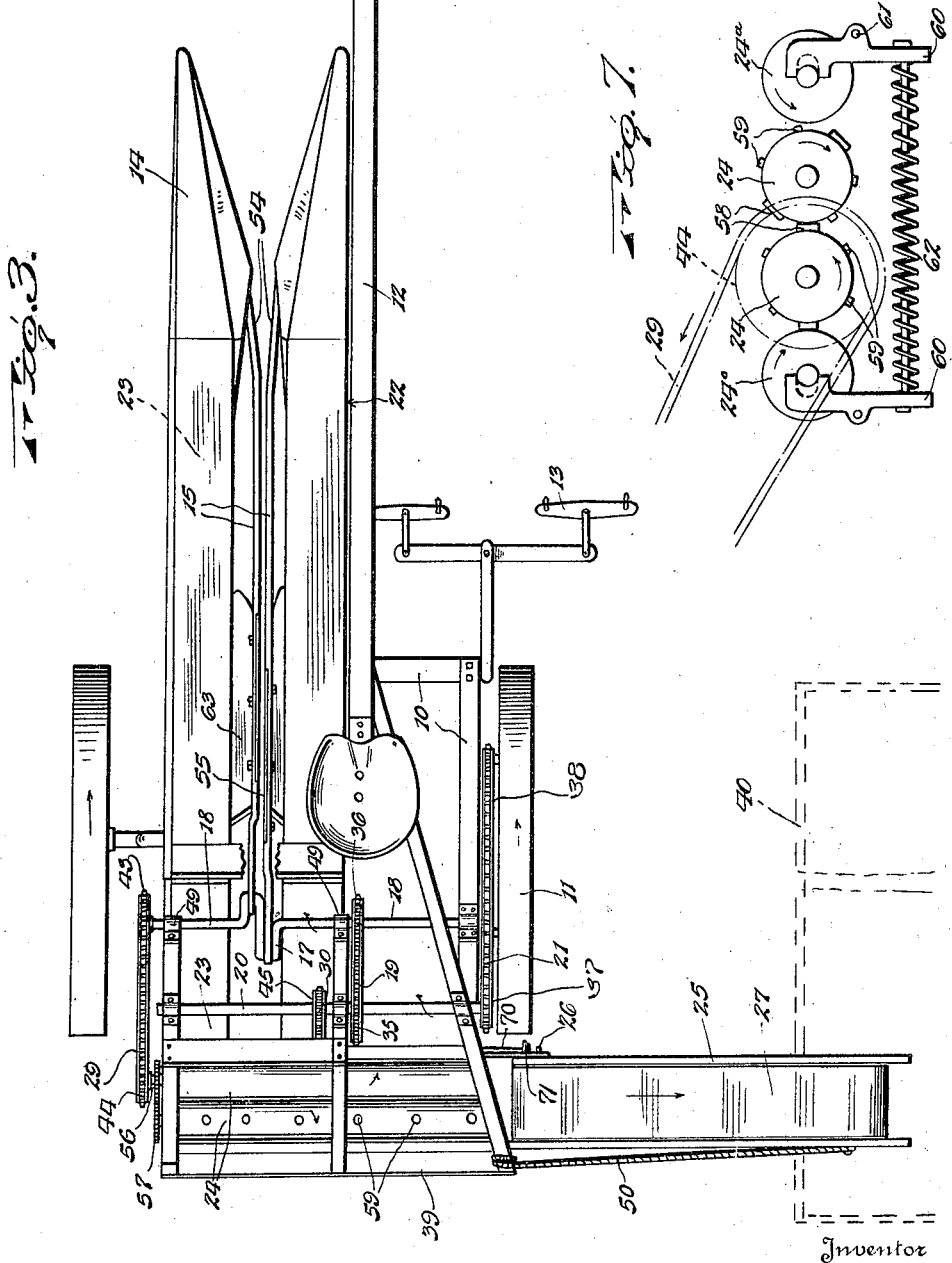

1,516,067

UNITED STATES PATENT OFFICE.

FREDERICK E. TUCKER, OF GILTNER, NEBRASKA.

CORN-HUSKING MACHINE.

Application filed April 18, 1922. Serial No. 554,931.

*To all whom it may concern:*

Be it known that I, FREDERICK E. TUCKER, a citizen of the United States, residing at Giltner, in the county of Hamilton and State of Nebraska, have invented certain new and useful Improvements in Corn-Husking Machines, of which the following is a specification.

My invention relates to machines for picking and husking corn and the object of the invention is to provide a machine of this class which is able to first pick the ears from the standing corn, the smallest as well as the largest, then husk the ears and deliver them into a wagon which is driven alongside the machine by the same team that pulls the latter, four horses being sufficient to do this work and one driver for the team.

A novel feature of the invention resides in the furnishing of bars operating in the manner of shears for severing the ears from the stalks, instead of the usual snapping rollers. The latter are apt to crush the ears in tearing them off the stalks, particularly the smaller ears, while the bars used on my machine actually snap off the ears without injuring them, no matter what size the ears are.

Another object of the invention is to build a machine very light and compact, so that four horses with ease are able to pull the machine, together with the collecting wagon.

In the accompanying drawings one embodiment of the invention is illustrated, and Figure 1 is a side elevation of the husking machine in operating position;

Figure 2 is a longitudinal section thereof;

Figure 3 is a top plan view of Figure 1;

Figure 4 is a transverse section on the line 4—4 of Figure 1;

Figure 5 is a fragmetnary side elevation showing the driving connections;

Figure 6 is a transverse section along line 6—6 of Figure 2;

Figure 7 is a side view showing the gearing of the husking rollers, and

Figure 8 is a transverse section similar to Fig. 6, indicating the swinging of the flapping boards.

The machine consists of a frame 10 supported on a pair of wheels 11 and provided with a pole 12 and singletrees 13 for one pair of horses. The frame with the machine in operation has an inclined position, as seen in Figures 1 and 2, and terminates at the forward end with a pair of gatherers 14 which are spaced apart to form an opening between them for collecting the standing corn, which is gathered at the forward end, where the gatherers are furtherest apart.

In the direction of the opening provided between the gatherers are positioned a pair of flat bars 15, which have a hinged connection, by means of short links 16, with the frame 10 at the forward end of the gatherers. The opposite ends of the bars 15 are pivoted on cranks 17 furnished on the shaft 18 carried in bearings 49 on the frame 10 transversely thereto. As best seen in Figure 3, the bars 15 are spaced slightly apart and run parallel with each other the greater part of their length, but diverge at their lower or forward ends, as at 54, in order to receive the corn stalks collected by the gatherers 14. Near their upper ends, the bars 15 carry each a knife 55, which is bolted or in any other suitable manner secured on the bar, with the cutting edge uppermost and extending above the bars 15. The crank shaft 18 has, by means of a chain 19 and suitable sprocket wheels 35, 36, driving connection with the main shaft 20, mounted parallel with the crank shaft 18 on top of the frame 10. This main shaft is in driving connection, by means of a chain 21 and sprocket wheels 37, 38 with the right-hand wheel 11 of the machine. It will now be seen that, as the machine travels forward, the crank shaft 18 will be revolved in the direction of arrow X in Figure 1, whereby the snapping bars 15 will receive a reciprocating motion through the action of the cranks 17 and the links 16.

Alongside of each of the snapping bars 15 in longitudinal direction of the machine is provided a trough 22, in the bottom of which is furnished an endless elevating belt or apron 23 mounted on rollers 41, 42. These aprons are so positioned that they receive the ears when snapped off by the snapping bars 15 and carry them in slightly inclined direction upward toward the rear of the machine for delivery to the husking rollers 24 and 24$^a$. These rollers, four in number, carried transversely to the machine, as best seen in Figures 2, 3 and 7, are revolubly mounted in a frame or casing 39 with their right-hand ends lower than their left-hand ends, looking towards the front end of the machine.

The two middle rollers 24 are mounted at a fixed distance and carry spur gears 56, 57, meshing with each other and one of the rollers is driven by a chain 29 running over a sprocket 44 attached to this roller. Each of the middle rollers 24 has two longitudinal ribs 58 and eight or more knobs or pickers 59 about one-eighth of an inch high. These ribs and knobs assist in severing the husks from the cobs and carrying them down between the rollers.

The outer rollers 24ª are smooth-faced and carried in bearings on the casing 39, permitting a slight transverse movement of the rollers. Reference numeral 60 represents levers engaging with the trunnions of these rollers. These levers 60 are pivoted, as at 61, on the casing 39 and between their lower ends is held a spring 62 tending to press the upper ends of the levers inwardly against the trunnions of the smooth rollers 24ª, so that the latter are always held tightly against the inner rollers. The rollers are preferably tubular, about three feet in length, ordinary iron pipes being used.

Adjacent the right-hand ends of the husking rollers 24, 24ª and in longitudinal direction thereof, is positioned an elevator 25, which is hinged to the frame 39, as at 26, so as to be angularly adjustable on the machine by means of a rope or other flexible member 50. This elevator is provided with an endless belt 27 and adapted to deliver, at its free end, the husked corn into the wagon 40 following alongside the machine during operation.

The apron 23 is driven from the main shaft 20 by means of a chain 30 running over sprocket wheels 45 and 46, the chain engaging with the sprocket wheel 28. The chain 30 also drives the belt 27 through the intermediary of the sprocket wheel 46 fixed on a transverse shaft 70. On the end of the latter is keyed a pinion 71 in mesh with a bevel gear 72 carried on one end of the hinge roller 26 at the lower end of the belt 27. The crank shaft 18 drives the husking rollers 24 by means of a chain 29 and sprocket wheels 43, 44 and spur gears 56, 57.

At the upper end of each trough 22, see Figures 2 and 6, is provided a cross rod or baffle beam 47 serving to bend the highest stalks down between the snapping knives 55 in order to prevent such stalks from passing through the machine without the ears being cut off. Beneath the knives 55 are situated a pair of flapping boards 63 hinged in the troughs 22, as at 64, and lightly pressed together at their upper edges by means of springs 65. The purpose of these boards is to guide and hold the stalks in readiness for the ears to be snapped off by the bars 15 or the knives 55.

The operation of the machine is as follows: As the machine proceeds forwardly, pulled by the team, the standing corn stalks are collected by the open jaws of the gatherers 14 passing in between the slightly separated snapping bars 15 which, being set in motion by the wheel 11 rotating in the direction of arrow Y, Figure 1, receive a reciprocating and slightly oscillatory motion and by this means easily snap off the ears from the corn stalks. As the ears are severed by the bars 15 or their knives 55, they fall down to the right or left of the snapping bars 15 into the troughs 22 where the aprons 23 carry them up to the husking rollers 24 and 24ª where the husks are taken off and dropped down between the rollers and the ears of corn proceed upwardly on the belt 27 to the wagon 40.

From the above given description, it will be evident that, on account of its exceedingly simple construction, the machine is very easy to handle and cannot get out of order unless very carelessly and roughly treated.

The action, too, of the snapping bars makes it particularly effective. These bars simulate the operation of shears, practically cutting off the ears from the corn stalks instead of tearing them off, as is usual with the ordinary snapping rollers.

The machine accordingly possesses several novel features and advantages over other machines of this class, whereby a considerable stride forward in the art has been made through the present invention.

Having thus described the invention, what is claimed as new is:

1. In a wheel husking machine having inclined gatherers, reciprocable snapping bars placed in parallel vertical planes in juxtaposition to said gatherers and substantially at the same longitudinal inclination and provided with cutting edges on their top sides, carrying aprons alongside of said bars, yieldable gripping elements mounted to oscillate transversely to said snapping bars and beneath the same, and operating means for the bars actuated by the vehicle wheels.

2. In a wheel husking machine having inclined gatherers, flat sided snapping bars placed in parallel vertical planes in juxtaposition to said gatherers and substantially at the same longitudinal inclination, the adjacent sides of said bars having upwardly directed knife edges, yieldable gripping elements mounted to oscillate transversely to said snapping bars and beneath the same, and operating means for the bars actuated by the vehicle wheels.

3. In a wheel husking machine having inclined gatherers, flat sided snapping bars placed in parallel vertical planes in juxtaposition to said gatherers and substantially at the same longitudinal inclination, the adjacent sides of said bars having upwardly directed knife edges, a carrying apron positioned alongside each of said bars, a trough for each apron, flapping boards pivotally mounted in said troughs beneath said snapping bars, elements tending to hold the free ends of said boards yieldably together, and operating means for the bars actuated by the vehicle wheels.

In testimony whereof I affix my signature.

FREDERICK E. TUCKER. [L. S.]